United States Patent
Fairgrieve et al.

(10) Patent No.: US 11,345,343 B2
(45) Date of Patent: May 31, 2022

(54) CONTROLLER AND METHOD FOR CONTROLLING THE DRIVING DIRECTION OF A VEHICLE

(71) Applicant: JAGUAR LAND ROVER LIMITED, Coventry (GB)

(72) Inventors: Andrew Fairgrieve, Warwickshire (GB); Paul John King, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 329 days.

(21) Appl. No.: 16/261,163

(22) Filed: Jan. 29, 2019

(65) Prior Publication Data
US 2019/0241181 A1 Aug. 8, 2019

(30) Foreign Application Priority Data
Feb. 2, 2018 (GB) ..................... 1801725

(51) Int. Cl.
*B60W 30/12* (2020.01)
*B60W 50/08* (2020.01)
(Continued)

(52) U.S. Cl.
CPC .......... *B60W 30/12* (2013.01); *B60W 50/087* (2013.01); *B60W 50/10* (2013.01); *G06V 20/588* (2022.01); *B60W 2720/24* (2013.01)

(58) Field of Classification Search
CPC .... B60W 30/12; B60W 50/087; B60W 50/10; B60W 2720/24; G06K 9/00798; B62D 6/003
See application file for complete search history.

(56) References Cited

U.S. PATENT DOCUMENTS

| 2011/0231063 A1* | 9/2011 | Kim .................. G06F 7/00 701/41 |
| 2015/0085506 A1* | 3/2015 | Hoffman ............ B60Q 1/085 362/465 |

(Continued)

FOREIGN PATENT DOCUMENTS

| KR | 1020140076433 | 6/2014 |
| WO | 2010016108 | 2/2010 |

(Continued)

OTHER PUBLICATIONS

Search and Examination Report, GB1801725.1, dated Jul. 28, 2018, 8 pp.

*Primary Examiner* — Russell Frejd
*Assistant Examiner* — Anthony M Gartrelle
(74) *Attorney, Agent, or Firm* — McCoy Russell LLP

(57) ABSTRACT

A controller can include an electronic processor unit configured to control the driving direction of a vehicle within a lane based on a first trajectory. The controller can be operable to receive a user input for directing the vehicle along a second trajectory that is different from the first trajectory, determine third trajectory data by at least comparing data associated with the first trajectory to data associated with the second trajectory, and output a control signal for controlling, using the electronic processor unit, the driving direction of the vehicle. The control signal can be based at least on the third trajectory data.

18 Claims, 10 Drawing Sheets

(51) Int. Cl.
*B60W 50/10* (2012.01)
*G06V 20/56* (2022.01)

(56) References Cited

U.S. PATENT DOCUMENTS

2015/0259006 A1* 9/2015 Inoue ................... B62D 6/003
2020/0172123 A1* 6/2020 Kubota ................ B60W 50/14

FOREIGN PATENT DOCUMENTS

| WO | WO2010016108 A1 * | 11/2010 | ........... B60W 30/08 |
| WO | 2017022474 | 2/2017 | |
| WO | WO2017022474 A1 * | 9/2017 | ........... B62D 15/025 |

* cited by examiner

CONTROLLER AND METHOD FOR CONTROLLING THE DRIVING DIRECTION OF A VEHICLE

CROSS-REFERENCE TO RELATED APPLICATION

This application claims priority to and the benefit of Great Britain Patent Application No. 1801725.1 filed Feb. 2, 2018, which is incorporated herein by reference in its entirety.

TECHNICAL FIELD

The present disclosure relates to a controller and method for controlling the driving direction of a vehicle and particularly, but not exclusively, to updating the automated steering with the user input taken into account. Aspects of the invention relate to a controller for controlling the driving direction of a vehicle, to a system comprising the controller, to a vehicle comprising the system or controller; and to a method.

BACKGROUND

Some modern vehicles feature an automated steering system, which controls the steering of the vehicle to adopt a trajectory that follows the centre of a detected lane. A problem with this system is that there are certain situations in which the driver may wish to alter the proposed trajectory. For example, the automated steering system may not take into account the driver's preferences, changing topography and obstacles when calculating the optimum trajectory, or at least not process their significance. If a hedge or other obstacle blocking a width of the lane is detected, it may not calculate that if the vehicle is positioned in the centre of the available lane, it could obstruct oncoming traffic. If a road widens to allow traffic in both directions, the driver may wish to adjust the vehicle to account for oncoming vehicles. In such situations, it makes sense for the driver to adjust the vehicle's trajectory accordingly. The driver may also wish to continue using the automated steering, with their preferences in that situation taken into account.

The present invention has been devised to mitigate or overcome at least some of the above-mentioned problems.

SUMMARY

According to an aspect of the present invention there is provided a controller for controlling the driving direction of a vehicle within a lane based on a first trajectory; the controller configured to receive a user input for directing the vehicle along a second trajectory different to the first trajectory; the controller comprising an electronic processor unit configured to: determine third trajectory data by at least comparing: data associated with the first trajectory; to, data associated with a second trajectory; output a signal based at least on the third trajectory data.

An automatic steering system, for example, may steer a vehicle when no user input is applied or when a user input is applied that would divert the vehicle away from the first trajectory. The controller may therefore use a user input to update the trajectory that the vehicle should be directed along. The vehicle user may be deliberately providing a steering response, such as turning a steering wheel, to keep the vehicle along a particular trajectory that is different to the first trajectory. This may be for a number of reasons, including, but not limited to, taking the centre of the road when the road narrows as there is no longer space for an oncoming vehicle to pass and repositioning a vehicle to avoid a hedge and/or to improve visibility of the oncoming road. If the vehicle's automated steering system acts to resist or correct the steering of the vehicle then the user will not be in the user-desired position for driving. The controller updates or creates new third trajectory data that is used to automatically control or correct the vehicle's steering. The controller may therefore learn the user's preferences when outputting signals to keep a vehicle within a lane. These learned preferences may be applied immediately to the vehicle's driver assist system and/or stored on a memory storage unit for further use. The user-preferred vehicle position data (be it trajectory data or other position related data) may be stored along with one or more of the corresponding data values associated with the environment condition of the lane/road when the user applied the input. When stored for further use, the controller may take further environment measurements to ascertain when the vehicle encounters similar lane environments. For example, this may be carried out using an environment monitoring system and/or a vehicle monitoring system. Once the environment is determined to be encountered again, the same user trajectory preferences may be applied or at least be taken into account when calculating the trajectory the automated steering system should follow. In some circumstances the environment data may be derived from other data sources such as GPS data and/or stored map data.

The controller may be adapted to include any configuration or feature disclosed herein, including but not limited to any one or more of the following.

The controller may be configured to store, in a memory storage unit, any one or more of the first, second or third trajectory data.

The output signal may be a control signal for controlling, using the electronic processor unit, the driving direction of the vehicle; the control signal based at least on the third trajectory data.

The controller may be configured such that the data associated with the second trajectory may comprise data indicating the vehicle position. The data indicating the vehicle position may comprise any one or more of: data based upon the output of one or more position sensors; GPS data.

The controller may be further configured to: determine trajectory offset data by comparing the first trajectory to the second trajectory; determine the third trajectory using the first trajectory and the trajectory offset data.

The controller may comprise controlling the driving direction of the vehicle based on the third trajectory.

The controller may be configured such that the electronic processor unit is further configured to: determine a duration of the user input; compare the duration to threshold duration data; initiate the step of determining of the third trajectory data based on the comparison of the duration to the threshold duration data.

The controller may be configured such that the electronic processor unit is further configured to: receive topographical data associated with an environment outside of the vehicle; determine the control signal based further on the topographical data.

The controller may be configured such that the electronic processor unit is further configured to: determine topographical boundary data from the topographical data; determine the control signal based further on the topographical boundary data.

The controller may be configured such that the electronic processor unit is further configured to: determine the third trajectory data further using any one or more of: vehicle size data; one or more vehicle position rules.

According to a further aspect of the invention, there is provided a vehicle comprising a controller according to the preceding aspect of the invention.

There is also provided in a further aspect of the present invention a method for controlling the driving direction of a vehicle using an electronic processor unit; the electronic processor unit being configured to control the driving direction of the vehicle within a lane based on a first trajectory; the method comprising: receiving a user input for directing the vehicle along a second trajectory different to the first trajectory; determining third trajectory data by at least comparing: data associated with the first trajectory; to data associated with the second trajectory; outputting a control signal for controlling, using the electronic processor unit, the driving direction of the vehicle; the control signal based at least on the third trajectory data.

For example, a vehicle may use trajectory data to automatically steer the vehicle along a particular (first) trajectory within a lane.

The method may be adapted to include any configuration or feature disclosed herein, including but not limited to any one or more of the following.

The method may be configured such that the data associated with the first trajectory and data associated with the second trajectory is stored in a memory storage unit.

The method may be configured such that the output signal comprises a control signal for controlling, using the electronic processor unit, the driving direction of the vehicle; the control signal based at least on the third trajectory data. The data associated with the second trajectory may comprise data indicating the vehicle position. The data indicating the vehicle position may comprise any one or more of: data based upon the output of one or more position sensors; GPS data.

The method may comprise determining trajectory offset data by comparing the first trajectory to the second trajectory; determining the third trajectory using the first trajectory and the trajectory offset data. The method may comprise controlling the driving direction of the vehicle based on the third trajectory.

The method may further comprise determining a duration of the user input, comparing the duration to threshold duration data; initiating the step of determining of the third trajectory data based on the comparison of the duration to the threshold duration data.

The method may further comprise receiving topographical data associated with an environment outside of the vehicle; determining the control signal based further on the topographical data.

The method may further comprise determining the third trajectory data further using any one or more of: vehicle size data; one or more vehicle position rules.

There is also presented a computer readable medium comprising computer readable instructions configured to give effect to the method.

BRIEF DESCRIPTION OF THE DRAWINGS

One or more embodiments of the invention will now be described, by way of example only, with reference to the accompanying drawings, in which.

DETAILED DESCRIPTION OF THE EMBODIMENTS

Figure 1A:
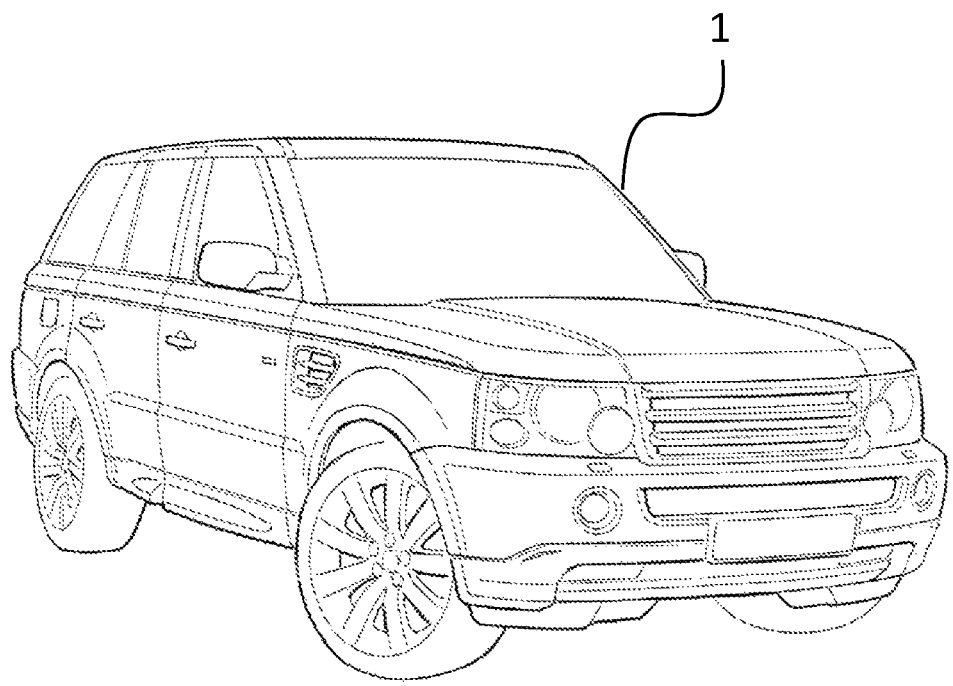
FIG. 1A illustrates an embodiment of a vehicle in accordance with the present invention.

An automated steering system in a vehicle may direct a vehicle 1 (FIG. 1A) to follow the centre of a marked lane, perhaps by inferring a particular lane size from white lines on the road. This can be effective in a structured road environment. However, a driver may disagree with the vehicle's position in the lane calculated by the automated steering system. In some situations, the correct position for the vehicle within the detected lane is less clear.

Figure 1B:
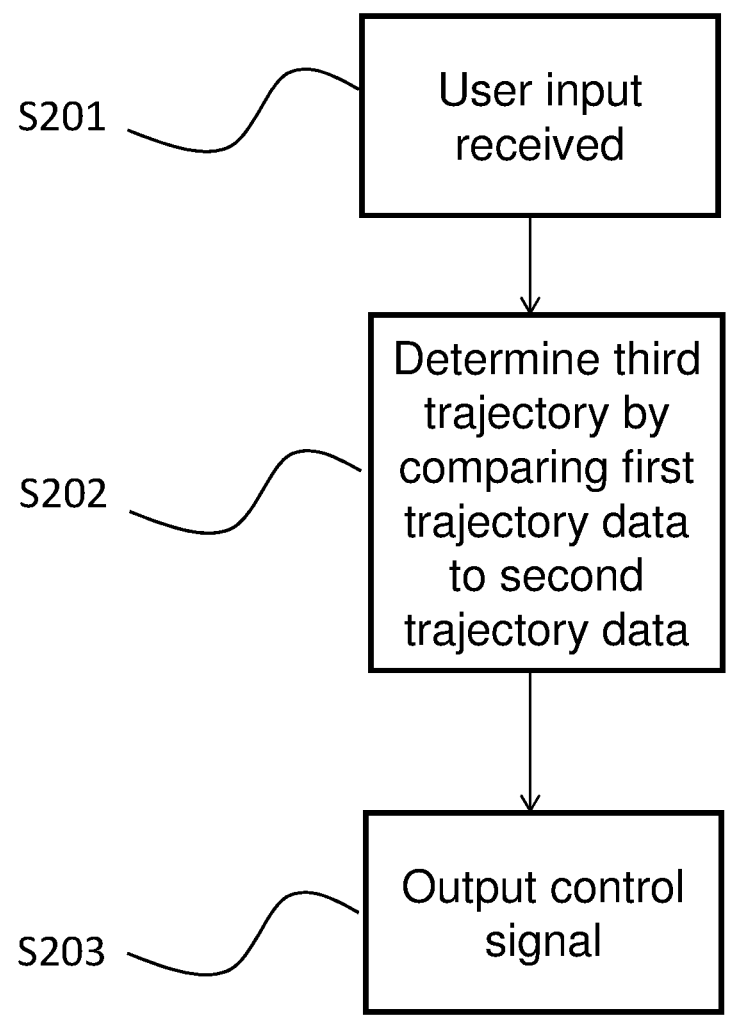
FIG. 1B illustrates an example method in accordance with the present invention.
Figure 1C:
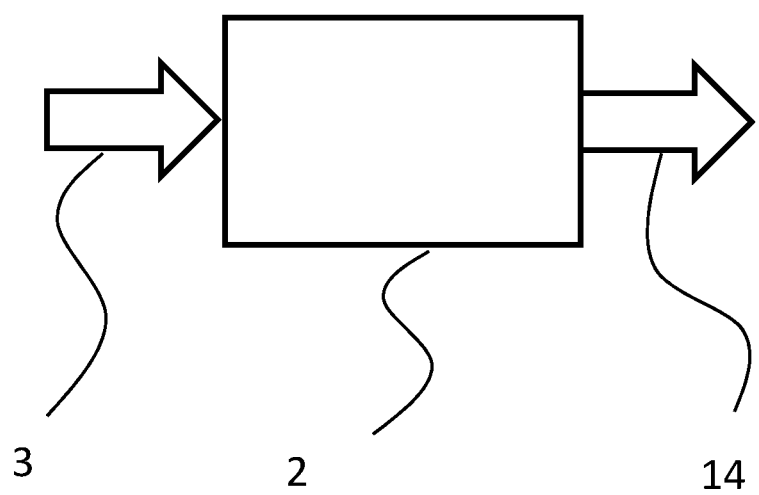
FIG. 1C illustrates an embodiment of a controller in accordance with the present invention.
Figure 2:
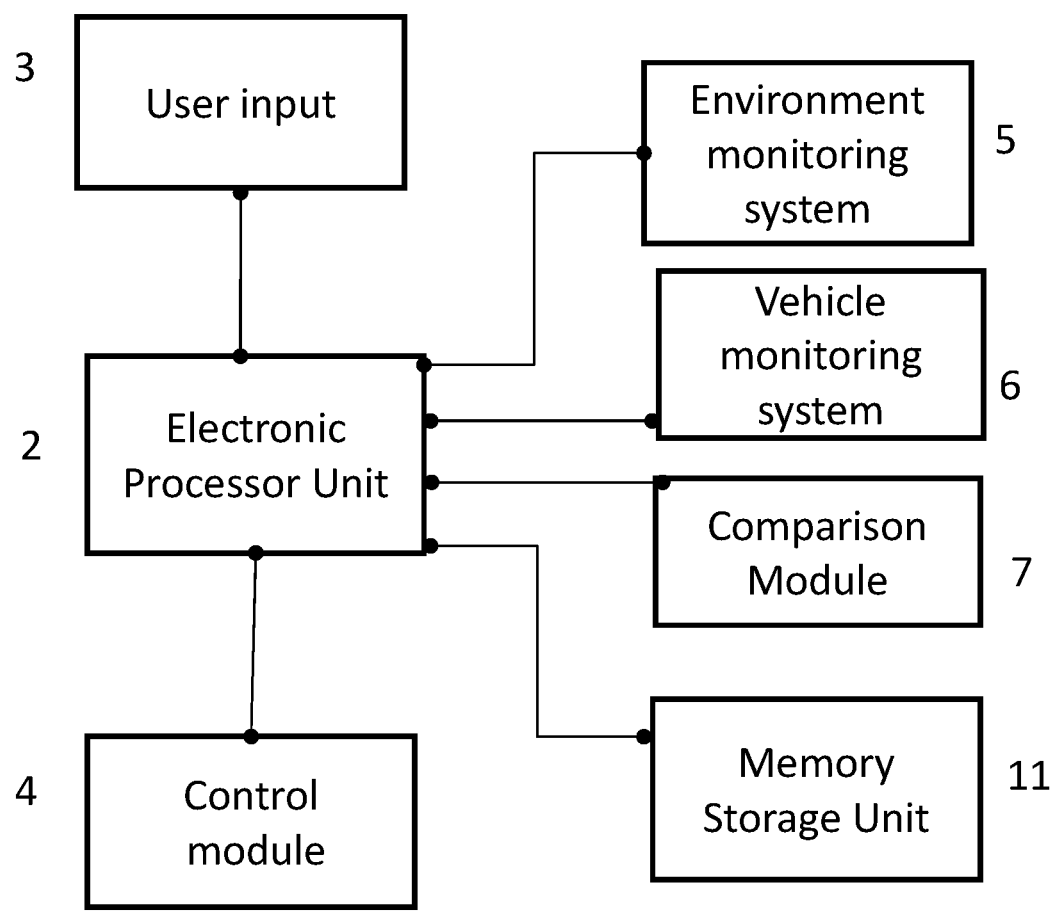
FIG. 2 illustrates an embodiment of a controller in accordance with the present invention.

There is presented a method for at least partially controlling a driving direction of a vehicle 1, as shown in FIG. 1B. The term partially controlling is understood to mean that other influences may be controlling the driving direction of the vehicle 1 in conjunction with the method. The method may use an electronic processor unit 2, shown in FIG. 2 and FIG. 3. The electronic processor unit 2 is configured to at least partially control the driving direction of the vehicle 1 within a lane, based on a first trajectory. A first trajectory may be defined as a default guidance trajectory in accordance with the target path. For example, the target path may comprise staying within a road traffic lane. The first trajectory may be determined by the automated steering system and may, as a default, guide the vehicle's motion along the centre of the lane. The first trajectory data may be associated with vehicle position data obtained from an environment monitoring system 5 and a vehicle monitoring system 6. As shown in FIG. 1C, the electronic processor unit 2 may be configured to receive a user input 3, which may instruct the vehicle to follow a second trajectory, different to the first trajectory. The electronic processor unit 2 may be further configured, using a comparison module 7, to determine a third trajectory by at least comparing data associated with the first trajectory to data associated with the second trajectory. The third trajectory may be defined as the updated guidance trajectory. The third trajectory may also be determined by the automated steering system and is also determined in accordance with the target path. The third trajectory provides updated guidance of the vehicle's motion taking the driver's intentional offset from the first trajectory into account.

For example, an automated steering system may direct a vehicle to follow a first trajectory. The vehicle user may decide to follow a second trajectory instead and direct the vehicle to do so by submitting a user input 3. The electronic processor unit may receive the user input and detect that the vehicle user is intending to override the automated steering system. The electronic processor unit may then allow the vehicle user to manually direct the vehicle to follow the second trajectory. The second trajectory may be determined using the environmental monitoring system and vehicle monitoring system. The data associated with the second trajectory may comprise data indicating the vehicle's position. The second trajectory may, for example, be a parallel trajectory, 0.5 m to the right of the first trajectory. The lateral displacement between the first trajectory and the second trajectory may be defined as the trajectory offset 21. In this example, the trajectory offset is 0.5 m. The trajectory offset as a fraction of the lane dimensions may also be calculated and defined as the fractional offset.

The automated steering may re-engage and control the steering of the vehicle. It may be desirable to follow a third trajectory. For example, the environment monitoring system may detect that the lane is about to narrow or broaden and the vehicle should be re-positioned. The third trajectory may be calculated taking the trajectory offset into account. For example, the third trajectory may be calculated as the trajectory determined using the automated steering system plus the fractional offset. The fractional offset is now the trajectory offset as a fraction of the updated lane dimensions.

In other examples, the third trajectory may be calculated using any one or more of but not limited to: stored data indicating the user's preferred trajectory in a similar situation, such as the 'second trajectory' adopted when a lane had narrowed previously; stored data indicating the 'second trajectory' adopted when the vehicle had previously visited that location, which may be identified using GPS; stored data indicating the 'second trajectory' adopted for similar topography (e.g. hilly, rocky, muddy etc.), lane type (e.g. motorway, off-road, country roads etc.), landscape (e.g. forest, mountainous), and/or junction type (e.g. roundabout, T-junction etc.). This is advantageous as certain situations may consistently benefit from a certain trajectory that is different to the trajectory useful in other situations. For example, it may be beneficial to distance a vehicle from the lane boundary when passing a forest, to avoid branches that could damage the vehicle. Similarly, it may be beneficial to position the vehicle away from the lane boundary if the lane boundary is a steep drop on the side of a mountain. If a vehicle user consistently directs the vehicle away from the lane boundary when driving on a road on the side of a mountain, the next time the vehicle is in that situation, the third trajectory can be updated taking that preference into account.

It may also be possible for the vehicle to adopt a third trajectory more closely matched to a certain second trajectory the more often the same second trajectory is chosen in that situation. That is, the third trajectory is not necessarily based on the most recent second trajectory adopted in that situation; it may be based on the second trajectory most commonly adopted. The system may also not only base the third trajectory on the second trajectory adopted by the driver of the vehicle in use, but also the second trajectories adopted by drivers of other vehicles in that situation and/or location. For example, this may be done by sharing and receiving trajectory and/or position data using Bluetooth, 3G, 4G and/or Wi-Fi.

Figure 4:
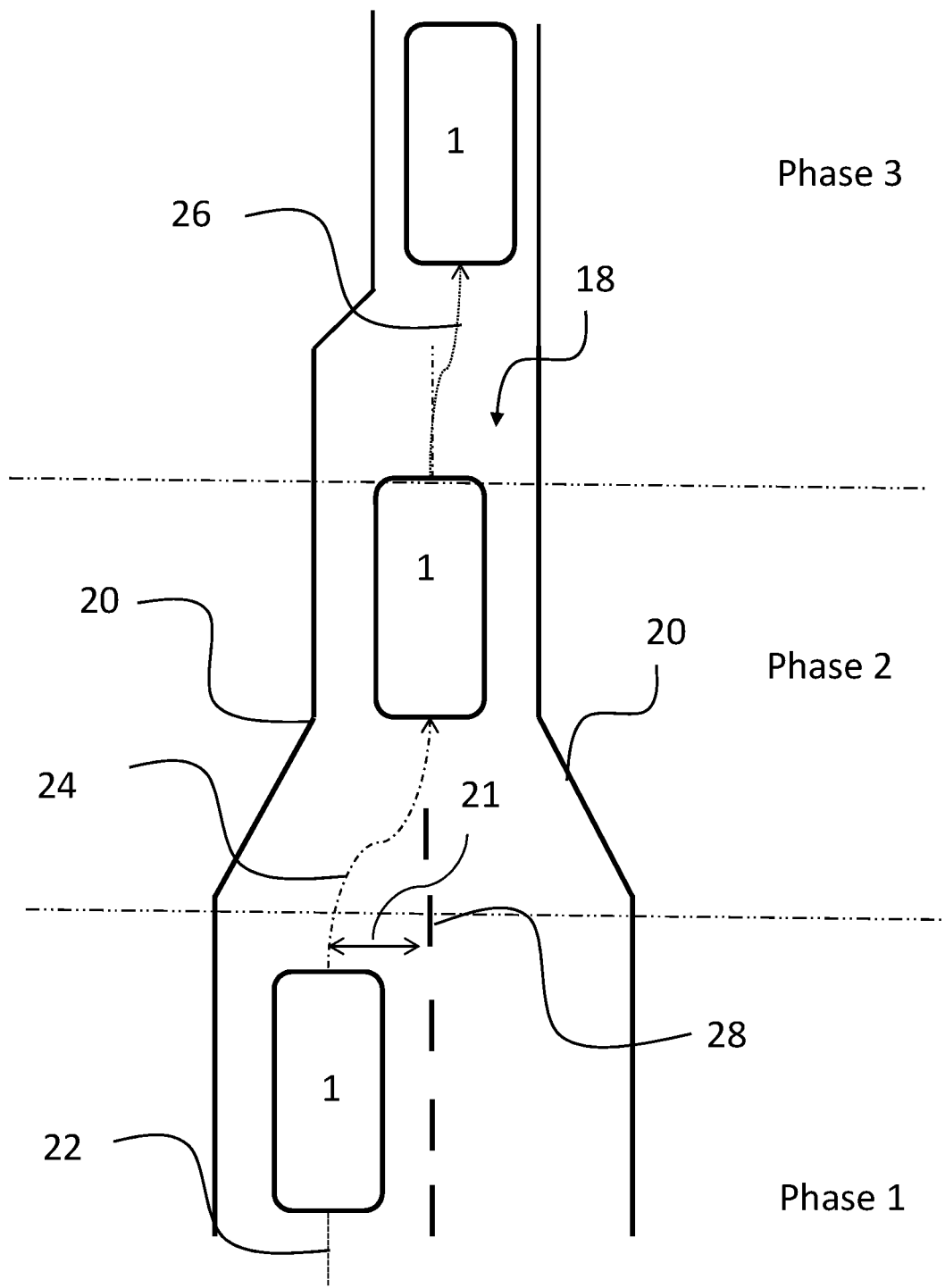
FIG. 4 illustrates an example situation, where the controller may be in operation.

FIG. 4 shows an example of a situation where a lane narrows so there is no longer room for traffic in each direction and a driver decides to move the vehicle 1 into the centre of the lane. It also shows how the various trajectories may be labelled. The numerical references: 18, 20, 21, 22, 24, 26 and 28 refer to the lane, lane boundary, trajectory offset, first trajectory, second trajectory, third trajectory and white road markings respectively. Phase 1 shows the vehicle following a first trajectory. Phase 2 shows the lane narrowing and the driver overriding the automated steering system and following a second trajectory. Phase 3 shows the lane narrowing again and the vehicle following a third trajectory, which is based on the driver's chosen trajectory (a second trajectory) when the lane had narrowed previously.

Figure 5:
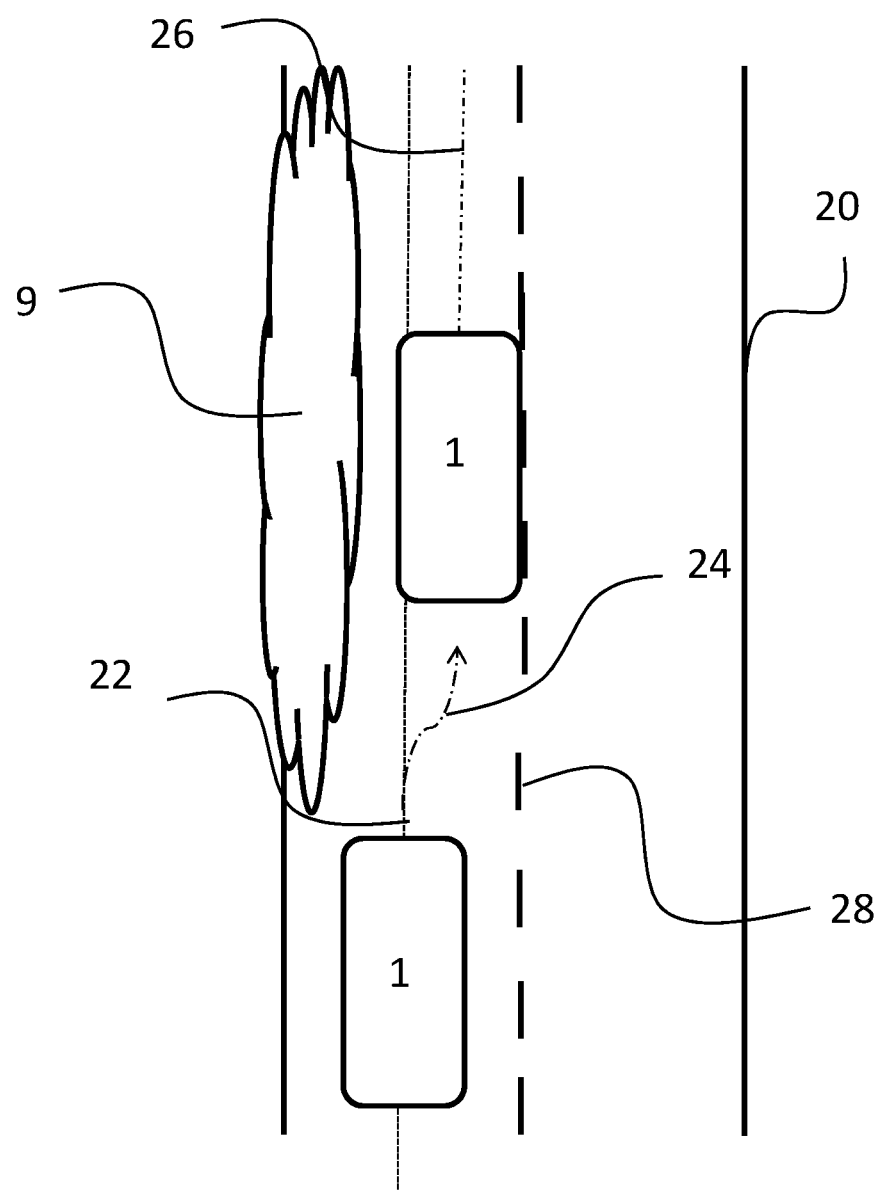
FIG. 5 illustrates an example situation where the controller may be in operation.

In another example, protruding hedges may make it difficult for vehicles to pass in the centre of the designated lane, as shown in FIG. 5. As in FIG. 4, the numerical references: 18, 20, 21, 22, 24, 26 and 28 refer to the lane, lane boundary, trajectory offset, first trajectory, second trajectory, third trajectory and white road markings respectively. If a hedge 9 blocks a section of the road width, the driver may wish to position the vehicle 1 closer to the centre of the road to avoid this. FIG. 5 shows how a driver user may override the automated steering system to follow a second trajectory and avoid the hedge. The automated system then updates the trajectory it follows to continue avoiding the hedge.

The method allows vehicle users to benefit from an adjustable and self-learning automated steering system. The user input can be used to update the third trajectory, resulting in an optimal lane position that satisfies the current driving environment and the driver's preferences.

Based at least on the third trajectory data, the electronic processor unit 2 outputs a control signal, via a control module 4, to control the driving direction of the vehicle, following the third trajectory. One example of such a control output is signal for providing automated and/or assisted steering of the vehicle.

The first, second and third trajectories may be represented by a series of successive position data values and/or one or more equations relating to the lateral position of the vehicle.

Reference is made to a vehicle 1. Some examples may refer to the vehicle 1 being a car. However, the method and controller may be applied to any vehicle, including but not limited to a land vehicle, watercraft or aircraft. The vehicle may be a transport vehicle for transporting people and/or cargo. The vehicle may be any of a wheeled, tracked, railed or skied vehicle. The vehicle may be a motor vehicle including but not limited to, a car, lorry, a motorbike, a van, a bus and/or a coach.

For the purposes of this disclosure, a 'lane' may be considered a path, road or track between two or more boundaries. Examples of boundaries include but are not limited to hedges, banks, walls, edges of raised platforms such as pavements, line markings or longitudinal sets of markings (such as broken line markings).

Figure 3:
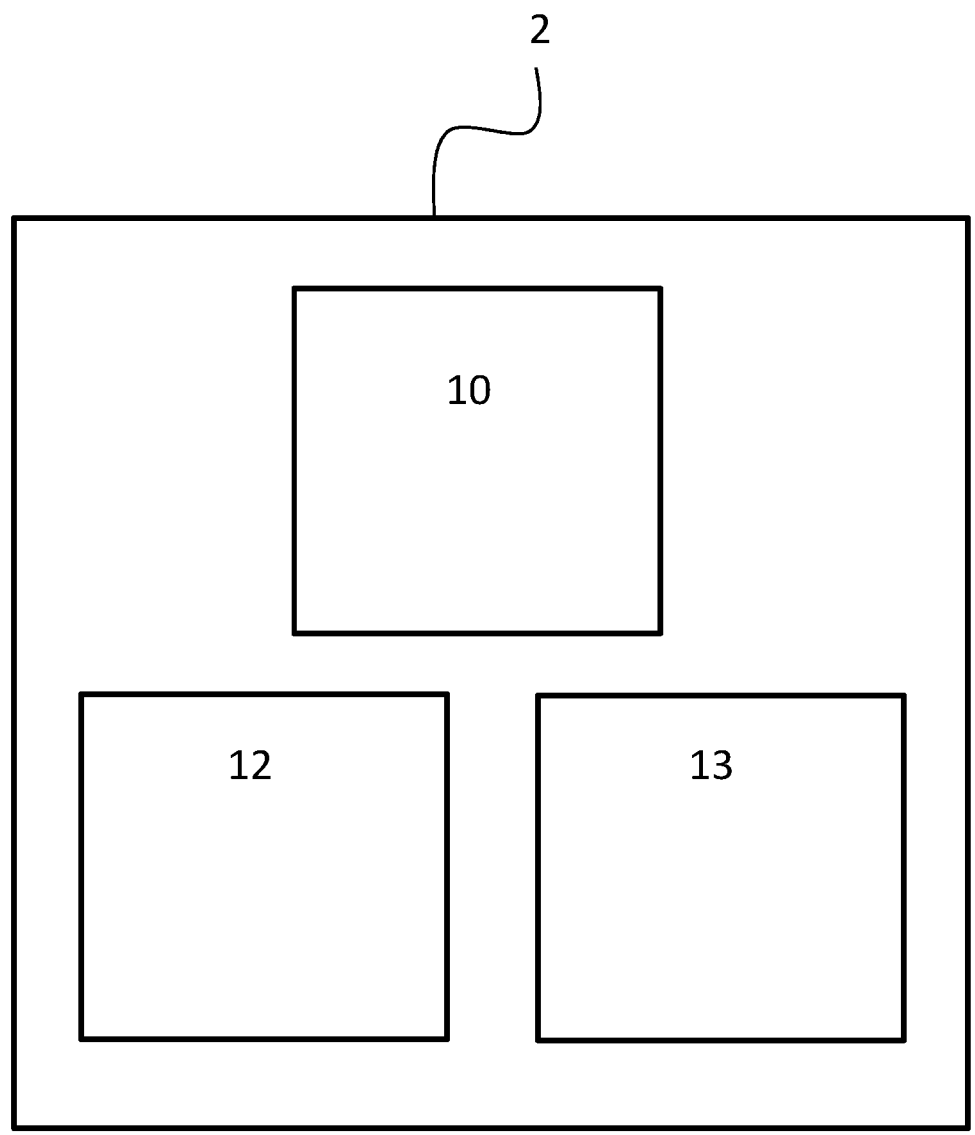
FIG. 3 illustrates an embodiment of the electronic processor unit in accordance with the present invention.

The electronic processor unit 2 may take the form of a computer, electronic controller or other means including, but not limited to, computer chip(s), hardware and/or software. An example of an electronic processor unit 2 is an electronic control unit (ECU). The electronic processor unit 2 may or may not be incorporated into the body of the vehicle 1. It may be any of: integrated with the vehicle 1; removably attachable to the vehicle 1; portable. The electronic processor unit 2 may comprise an input module 12, processor 10 and output module 13, as shown in FIG. 3. It may also comprise a memory storage unit 11 or the memory storage unit 11 may be separate to the electronic processor unit.

The memory storage unit 11 may comprise any memory or storage system such as but not limited to any one or more of: RAM (Random Access Memory), ROM (Read Only Memory), Hard Disk Drive (HDD), solid state drive, optical media, flash memory, and/or cloud storage. The memory storage unit 11 may be situated internally or externally to the vehicle. The data may be accessed directly or remotely such as but not limited to Wi-Fi, Bluetooth 3G and/or 4G, Examples of data that may be stored using the memory storage unit 11 may for example include, but are not limited to, first trajectory data, second trajectory data, third trajectory data, GPS data, lane dimension data, topography data and/or any data obtained by the environment monitoring system and/or vehicle monitoring system. The GPS data, lane dimension data, topography data and/or any data obtained by the environment monitoring system and/or vehicle monitoring system may be stored in relation to the first, second and/or third trajectory data.

Any one or more of the first trajectory data, second trajectory data, third trajectory data, trajectory offset data and/or any user preferences may be associated with a specific user. For example, the said data may be associated with any personal identifier including but not limited to a specific key, mobile device, face, voice, password, passcode and/or fingerprint, The personal identifier may be identified using for example any one or more of a computer chip, facial recognition software and/or device, voice recognition software and/or device, password/passcode identification system and/or fingerprint identification system, The identification data may also be stored using the memory storage unit 11.

The environment monitoring system 5 may refer to any system that monitors the environment in the vicinity of the vehicle 1 and/or the vehicle's relative position. It may detect features including, but not limited to, the topography, lane boundaries, lane dimensions, and the location and dimensions of obstructions blocking any portion of the detected lane. It may comprise a GPS, one or more sensors, one or more cameras or any other lane/location detection system. The types of sensors may include, but are not limited to, radar, infra-red, laser, ultrasonic and displacement sensors, for example.

Vehicle position data obtained from the environment monitoring system may define the lateral position of the vehicle. The vehicle's position may be the entire vehicle's location or the location of a specific point on the vehicle. For example, the vehicle's position may be assumed to be the location of the mid-point of the vehicle's rear axle.

The vehicle monitoring system 6 may refer to a system that determines and/or measures any vehicle parameter. For example, this can include, but is not limited to, the vehicle location, vehicle velocity, vehicle mass and the current status of any vehicle feature and/or component, such as the steering wheel. Sensors and data of the environment monitoring system 5 may be utilised in the vehicle monitoring system 6. The vehicle monitoring system and environment monitoring system may form part of the same monitoring system.

The comparison module 7 may comprise a system that determines the difference between one variable relative to another. The comparison module 7 may be separate to or be part of the electronic processor unit 2. For example, the comparison module may determine the displacement between the first trajectory and the second trajectory position data points.

For purposes of this disclosure, signals may be output or sent from one component to another component (for example, but not limited to signals sent between sensors and an electronic processor unit 2). These signals may be electronic or optical signals. The signals may be sent over wired or wireless communication channels such as, but not limited to, metal wires, optical fibres and/or wireless Radio Frequency (RF).

The signals may be output by one or more electronic or optoelectronic transmitters and received by one or more electronic or optoelectronic receivers, which in turn, may transmit further signals to other components. Alternatively the feature receiving the signal may directly utilise the signal and perform one or more actions using the signal. Similarly the feature may be configured to output the signals without the need for a further transmitter.

The term 'automated steering system' may refer to any automated vehicle control system and/or driver assist system and take the form of any level of driving automation. Examples of automated vehicle control systems that may be used include, but are not limited to automated steering system and assisted steering systems.

One example classification system that may be used to distinguish different levels of driving automation is the SAE International Standard J3016, which identifies 6 levels, levels 0-5. The present invention may comprise a driving automation system that can operate at any one or more of levels 1-5, for example, levels 2-4. A single vehicle may also operate at multiple levels.

Level 1 describes the act of assisting the driver with the steering or acceleration/deceleration of the vehicle. Level 2 refers to 'partial automation'. At level 2, the driver automation system may assist with the steering and acceleration/deceleration but the driver will perform all remaining aspects of the dynamic driving task. In levels 1 and 2, the driver monitors the driving environment.

For levels 3, 4 and 5, the automated driving system monitors the driving environment. Level 3 is known as 'conditional automation' and involves the automated driving system handling all aspects of the dynamic driving task, unless the driver responds appropriately to a request to intervene. Level 4 describes 'high automation'. At level 4, the automated driving system is in complete control of the vehicle but the system capability is limited to only some driving modes. 'Full automation' is level 5 and involves the automated driving system controlling all aspects of the dynamic driving task for all driving modes and under all roadway and environmental conditions that can be managed by a driver.

The term 'driving mode' refers to the type of driving scenario such as low speed traffic jams or high speed cruising. 'Dynamic driving tasks' describes operational and tactical aspects of driving such as steering and breaking and determining when to change lanes and use signals.

The electronic processor unit 2 may be part of a system incorporating an automated steering system. The electronic processor unit 2 may be separate to the automated/assisted steering system but be able to provide control signals to the automated/assisted steering system. The automated/assisted steering system uses the control signals to update its data, from which it derives its own control signals to control the direction of the vehicle.

The user input 3 can take any form. This can include, but is not limited to, a user manually selecting an option to override the automated steering via a vehicle-user interface such as a touch screen, an attempt to steer the vehicle 1 away from the first trajectory, detected by a sensor monitoring user input (for example a sensor incorporated into the steering system) and/or or a verbal command.

The automated steering system may control the steering of the vehicle 1 when no user input is applied. The automated steering system may also direct the vehicle to follow the first or third trajectory, providing the vehicle user is not intending to override the automated steering system.

Example of Operation

Figure 6A:
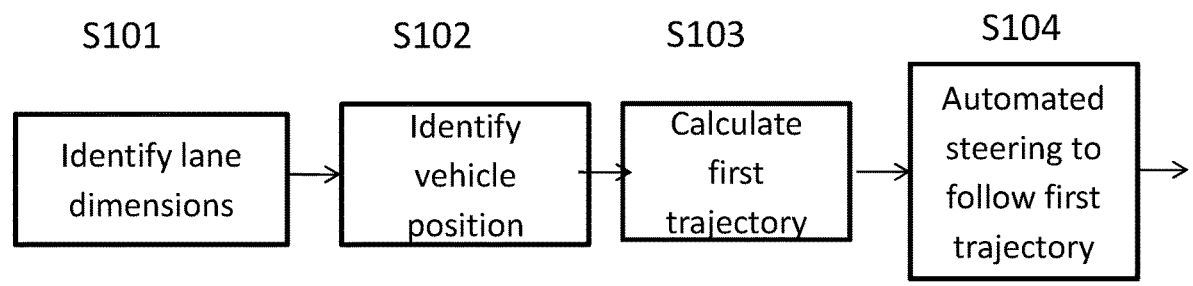
FIGS. 6A, 6B and 6C illustrate an example method of operation of the system.
Figure 6B:
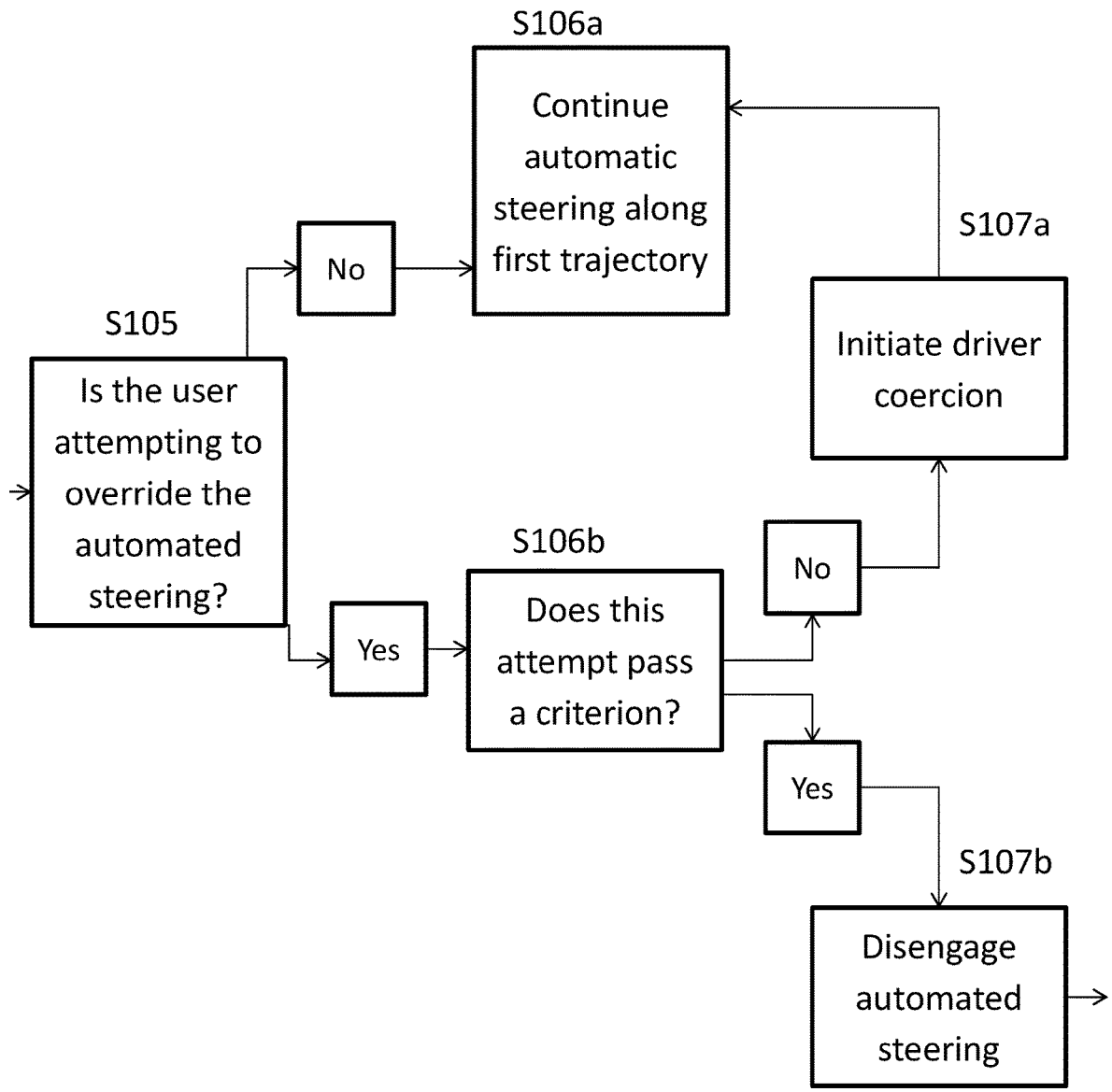
Figure 6C:
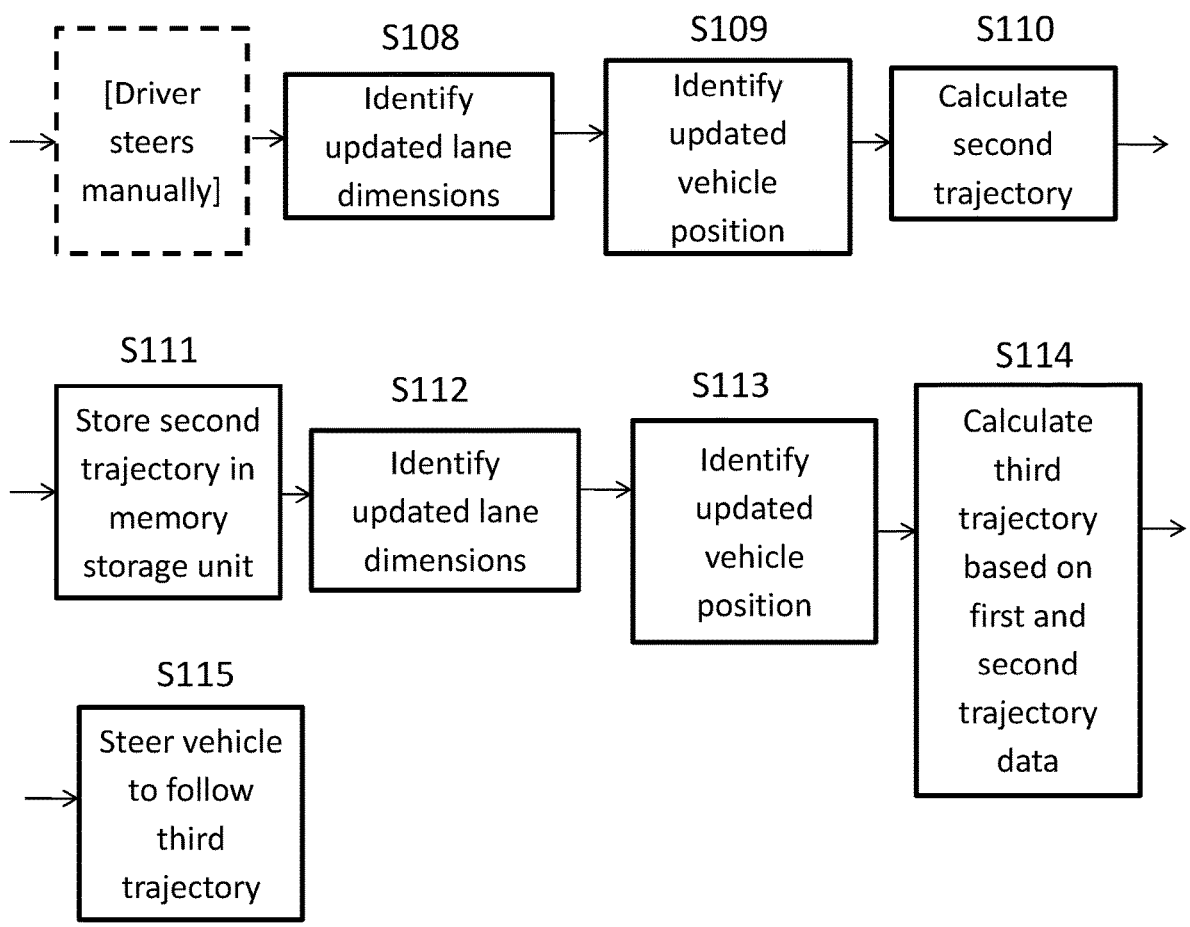

An example of operation of this method and controller is detailed in the flow chart of FIGS. 6A, 6B and 6C. It should be noted that these figures show an example of how the method may be carried out and it is not limited to these steps or this order of events. The method and controller described in the examples herein may be modified according to any configuration or feature described herein.

The environment monitoring system 5 may collect topographical data associated with the environment outside of the vehicle to determine the size of the lane a fixed distance in the vicinity of the vehicle (step S101, FIG. 6A). This data may be obtained using any one or more of: a GPS, one or more sensors, one or more cameras or any other lane/location detection system.

The vehicle monitoring system 6 and/or environmental monitoring system 5 may identify the vehicle position in relation to the said lane (step S102, FIG. 6A). This data could be obtained or generated via any position identification system including but not limited to one or more sensors and/or GPS.

Using the vehicle position data in conjunction with the dimensions of the detected lane, the first trajectory may be determined (step S103, FIG. 6A). This could, for example, be a route through the centre of the lane or the centre of half of the lane when accounting for traffic in each direction. If the vehicle is not following this first trajectory, a route may be planned by the automated/assisted steering system to direct the vehicle onto it. Examples of methods that may be used to determine a first trajectory include, but are not limited to, a polynomial prediction system and/or a Clothoid model.

A polynomial prediction can for example estimate the route the vehicle should take to join the first trajectory, although other methods could also be used. The route is updated in real time as the vehicle changes position. The polynomial can fit the curve of the route suggested, which may be calculated using any method such as, but not limited to, GPS data, one or more cameras, Light Imaging Detection And Ranging (LIDAR) and/or radar maps. The polynomial may be in the form of a quadratic or cubic model, whereby the quadratic model has the structure $y=bx^2+cx$ and the cubic model has the structure $y=ax^3+bx^2+cx$. y may, for example be the lateral distance across the lane, x the longitudinal distance along the length of the lane and a, b and c any numerical value. The polynomial may be calculated at a particular point/instance in time as the vehicle is travelling along the lane and may be updated (for example re-calculated) as the vehicle progresses along the lane and tends towards the first trajectory using the polynomial path.

One example of how the polynomial prediction system may be used to calculate the third trajectory is outlined below.

The third trajectory and the corresponding data that defines the third trajectory may be determined by applying a further trajectory offset to the 'y' value calculated using the polynomial (or other trajectory route calculation). For example, the first trajectory may be identified to have the coordinates (x1, y1), where x1 is 20 m and y1 is 2 m. The trajectory offset determined from the methods/controller described herein may be applied to this y1 value. For example, if a trajectory offset of +0.5 m is calculated, which, in turn is applied to the y1 value of 2 m (2 m from the left boundary of the lane), this results in an updated y coordinate, y2', of 2.5 m from the left boundary of the lane. It is to be understood that measurements of position may be made from different points with respect to the lane (for example different boundaries or the centre of the lane) and different points with respect to the vehicle (for example the middle point along the length of an axle; or a side edge of a vehicle). In certain situations, such as if the data is being fitted to a straight section of road and then a curved section of road, it may be advantageous to make use of a numerical estimation technique, which biases data that is close to the vehicle. Using this method, the data points that are closer to the vehicle may be more accurately modelled as the target path.

The automated steering system comprises a method for controlling the driving direction of the vehicle based on the first trajectory (step S104, FIG. 6A) and/or the third trajectory. The automated steering system is one example of a control signal output.

If it is detected that the driver is attempting to steer the vehicle 1 away from the first and/or the third trajectory, perhaps by using a pressure sensitive steering wheel, (step S105, FIG. 6B) the electronic processor unit 2 may initiate a warning notification and/or output a signal that actuates a force to resist against the efforts of the driver to steer the vehicle away from the first and/or the third trajectory (step S107*a*, FIG. 6B). This is useful in situations where the vehicle is drifting because the driver has lost concentration. For the purpose of this disclosure, the act of coercing the driver to follow a certain trajectory will be termed 'driver coercion'.

In some situations, the driver may wish to override the automated steering and steer the vehicle 1 to follow a second trajectory that is different to the first trajectory. To ensure this override is intentional, the computer may determine whether one or more criterion has been met, (step S106*b*, FIG. 6B). The criterion may, for example, be a threshold limit, such as a particular duration of effort against the driver coercion and/or the force exerted to turn the steering wheel.

The method and controller described herein may determine the said duration of effort against the driver coercion and/or force exerted to turn the steering wheel and compare it to threshold data. This data may be predetermined and stored on a memory storage unit. If the criterion is satisfied, a control signal may be outputted to reduce, pause or stop the driver coercion and allow the driver to manually control the position, steering and/or direction of the vehicle (step S107*b*, FIG. 6B). The driver may steer the vehicle to follow a second trajectory. The second trajectory may then be measured and/or determined (step S110, FIG. 6C) using the environmental and/or vehicle monitoring systems or any other method (steps S108 and S109, FIG. 6C, for example to determine a change in the lane dimensions) and stored in the memory storage unit (step S111, FIG. 6C).

It should be noted that there may be systems in place to inhibit features resisting driver controlled steering when it is detected that the driver is attempting to swerve, perhaps to avoid an unexpected obstacle. This may include disengaging automated steering and driver coercion when the steering wheel is adjusted with a sudden, sharp force, as opposed to gradual alterations.

When the system detects that the autonomous steering system is being overridden, a user input learning process may be initiated. This can take a multiple forms.

The updated vehicle position may be determined using a position identification system such as GPS, and the trajectory offset calculated.

The time duration between the steering of the vehicle 1 being controlled by the automated steering system and the steering of the vehicle being controlled by the driver may be predetermined, as may the time taken for the vehicle to start its 'learning' process. For example this may be two seconds or any other suitable time duration. Additionally or alternatively, the time duration may depend on one or more inputs, such as, but not limited to, any one or more of: whether or not the driver is still applying force to the steering mechanism and/or whether or not the vehicle has maintained a lateral position in the lane for a period of time. After the said time duration, to ascertain the user's desired lateral position of the vehicle 1, the method and system may do any one or more of: allow the automatic steering system to control the steering of the vehicle, stop the learning process.

The automatic steering system may be updated to follow a third trajectory (step S115, FIG. 6C). The third trajectory data is determined by at least comparing data associated with the first trajectory to data associated with the second trajectory (step S114, FIG. 6C). The calculation of the third trajectory may also take the updated vehicle position (step S113, FIG. 6C) and updated lane dimension (step S112, FIG. 6C) into account. The updated vehicle position and updated lane dimensions may be determined using the vehicle monitoring system and the environment monitoring system. In some examples the third trajectory may be the same as the driver-desired second trajectory. In other examples the third trajectory may be based on the second trajectory, but be different from it. For example, if the user-desired second trajectory presents a danger to the driver because the vehicle is too close to a particular lane boundary, the system may apply a further trajectory offset to take this into account. This may be for a number of reasons, for example if one boundary is close to a pedestrian walkway or because the lane dimensions have changed. Additional data may also be incorporated when calculating the third trajectory. This additional data may include, but is not limited to, any one or more of: vehicle size data, vehicle position sensors in an environment monitoring system 5 and map or GPS data. The determination of a trajectory offset to the first trajectory or other calculation such as the calculation of the third trajectory may use one or more vehicle position rules. These rules may be used to determine sources of data to use and/or to verify that the calculated third trajectory meets with predetermined criteria such as safety criteria. For example, driver information (such as whether the driver has passed their driving test) may be used to determine whether or not a calculated trajectory is safe to an inexperienced driver.

In one example, the electronic processor unit 2 may update the third trajectory based on a trajectory offset determined by the user input 3. This may be in the form of a percentage. If the route is planned using the polynomial prediction system, the trajectory offset value may be added to this calculation. This enables a route planner, which may form part of the electronic processor unit or any other device of the method and controller described herein, to adapt to changes in the lane width. For example, the trajectory offset may be presented in the form of a percentage of the detected lane. If the driver is following a second trajectory, 2 m off centre of an 8 m wide lane, and the first trajectory follows the centre of the line, then the trajectory offset would be +25%. The computer may calculate the first trajectory to follow the centre of this lane, at a width of 4 m, and measures the vehicle to be 2 m from this position. Since 2 m is 25% of 8 m, the trajectory offset is +25%. If the road width reduces to 6 m, the third trajectory may automatically update to have a trajectory offset of 1.5 m, being 25% of the road width. The computer learns the driver's preferred lateral position and updates the target path accordingly.

If the lane width is too narrow for the vehicle to safely adopt an altered trajectory, the requested trajectory offset may be set to zero.

In another example, if a user decides to override the automatic steering and move the vehicle into the centre of a lane when it becomes too narrow to fit two vehicles, the electronic processor unit 2 may store this information in a memory storage unit 11, such as but not limited to RAM, ROM, the cloud or other electronic memory devices. The next time the lane narrows to a width unsuitable for two lanes of traffic and the driver attempts to override the automated steering there may be no driver coercion or the first trajectory may be calculated based on the second trajectory adopted by the driver when the lane narrowed previously. The system will have learned that in this situation, the driver prefers to control his or her position in the lane.

In another example, the system may learn the desired vehicle trajectory relative to the geographical location. If the driver overrides the automated steering, perhaps to avoid an obstacle such as a hedge 9 blocking a section of the lane, the vehicle location and the trajectory offset can be stored in the memory storage unit 11. The next time the vehicle user is driving along this specific road, identified using GPS, the third trajectory may automatically adjust or suggest an adjustment to adopt this preferred trajectory offset.

The invention claimed is:

1. A controller for controlling the driving direction of a vehicle within a lane based on a first trajectory output by an automated steering system, wherein the controller is configured to receive a user input for directing the vehicle along a second trajectory that is different from the first trajectory, wherein the controller comprises an electronic processor unit configured to:
   determine trajectory offset data by comparing the first trajectory to the second trajectory;
   determine a fractional offset based on the trajectory offset as a fraction of lane dimension data;
   determine that the user input for directing the vehicle along the second trajectory occurred when the lane narrowed;
   subsequently detect that the lane is about to narrow again and determine third trajectory data using a trajectory output by the automated steering system, the fractional offset, and updated narrower lane dimensions; and
   output a signal based at least on the third trajectory data.

2. A controller as claimed in claim 1, further configured to store, in a memory storage unit, any one or more of the first, second, or third trajectory data.

3. A controller as claimed in claim 2, wherein the output signal is a control signal for controlling, using the electronic processor unit, the driving direction of the vehicle, wherein the control signal is based at least on the third trajectory data.

4. A controller as claimed in claim 2, wherein the data associated with the second trajectory comprises data indicating the vehicle position.

5. A controller as claimed in claim 1, further configured to:
   control the driving direction of the vehicle based on the third trajectory.

6. A controller as claimed in claim 1, wherein the electronic processor unit is further configured to:
   determine a duration of the user input;
   compare the duration to threshold duration data; and
   initiate determining the third trajectory data based on the comparison of the duration to the threshold duration data.

7. A controller as claimed in claim 1, wherein the electronic processor unit is further configured to:
   receive topographical data associated with an environment outside of the vehicle; and
   determine the control signal based further on the topographical data.

8. A controller as claimed in claim 7, wherein the electronic processor unit is further configured to:

determine topographical boundary data from the topographical data; and determine the control signal based further on the topographical boundary data.

9. A controller as claimed in claim 1, wherein the electronic processor unit is further configured to:

determine the third trajectory data further using any one or more of the following:
vehicle size data; and
one or more vehicle position rules.

10. A vehicle comprising a controller as claimed in claim 1.

11. A method for controlling the driving direction of a vehicle using an electronic processor unit, the electronic processor unit being configured to control the driving direction of the vehicle within a lane based on a first trajectory output by an automated steering system, the method comprising:

receiving a user input for directing the vehicle along a second trajectory that is different from the first trajectory;

determining trajectory offset data by comparing the first trajectory to the second trajectory;

determining a fractional offset based on the trajectory offset as a fraction of lane dimension data;

determining that the user input for directing the vehicle along the second trajectory occurred when the lane narrowed;

subsequently detecting that the lane is about to narrow again and determining third trajectory data using a trajectory output by the automated steering system, the fractional offset, and updated narrower lane dimensions; and outputting a control signal for controlling, using the electronic processor unit, the driving direction of the vehicle, wherein the control signal is based at least on the third trajectory data.

12. A method as claimed in claim 11, wherein the output signal comprises a control signal for controlling, using the electronic processor unit, the driving direction of the vehicle, wherein the control signal is based at least on the third trajectory data.

13. A method as claimed in claim 11, further comprising:
controlling the driving direction of the vehicle based on the third trajectory.

14. A method as claimed in claim 11, further comprising:
determining a duration of the user input;
comparing the duration to threshold duration data; and
initiating determining the third trajectory data based on the comparison of the duration to the threshold duration data.

15. A method as claimed in claim 11, further comprising:
receiving topographical data associated with an environment outside of the vehicle; and
determining the control signal based further on the topographical data.

16. A method as claimed in claim 15, further comprising:
determining topographical boundary data from the topographical data; and
determining the control signal based further on the topographical boundary data.

17. A method as claimed in claim 11, further comprising determining the third trajectory data further using any one or more of the following:
vehicle size data; and
one or more vehicle position rules.

18. A non-transitory computer readable medium comprising computer readable instructions that, when executed by a processor, cause the processor to perform the method of claim 11.

* * * * *